United States Patent [19]
Udding

[11] 3,755,216
[45] Aug. 28, 1973

[54] CYCLIC ETHER POLYMERIZATION PROCESS USING METAL ALCOHOLATE-METAL HYDROCARBYLXANTHATE REACTION PRODUCT CATALYST

[75] Inventor: Anne C. Udding, Amsterdam, Netherlands

[73] Assignee: Shell Oil Company, New York, N.Y.

[22] Filed: July 23, 1971

[21] Appl. No.: 165,706

[30] Foreign Application Priority Data
Sept. 16, 1970 Netherlands .................... 7013718

[52] U.S. Cl. ............. 260/2 A, 252/431 R, 260/2 X, 260/47 EP, 260/88.3 A
[51] Int. Cl. ........................................... C08g 23/14
[58] Field of Search ............... 260/2 A, 2 X, 47 EP, 260/88.3 A, 429.9

[56] References Cited
UNITED STATES PATENTS

| | | |
|---|---|---|
| 3,345,308 | 10/1967 | Lal .................................. 260/2 |
| 3,409,565 | 11/1968 | Lal .................................. 269/2 |
| 3,542,698 | 11/1970 | Lal .................................. 260/2 |
| 3,632,784 | 1/1972 | Lal .................................. 260/2 A |

OTHER PUBLICATIONS
J. Polymer Science 34, 161–3 (1959).

*Primary Examiner*—William H. Short
*Assistant Examiner*—E. A. Nielsen
*Attorney*—Ronald R. Reper et al.

[57] ABSTRACT

Cyclic ethers are polymerized in the presence of a catalyst comprising the reaction product of an O-hydrocarbyl xanthate of a divalent metal of Groups I, II, and IV to VIII of the periodic system and an alkoxide of a trivalent metal of Groups III, IV and VIII.

8 Claims, No Drawings

CYCLIC ETHER POLYMERIZATION PROCESS USING METAL ALCOHOLATE-METAL HYDROCARBYLXANTHATE REACTION PRODUCT CATALYST

The invention relates to a new process for the preparation of polyether-type homopolymers and/or copolymers. More particularly, the invention relates to polymerizing cyclic ethers, using a novel and very active catalyst system. The invention further relates to novel polymerization catalysts which do not require the use of expensive metal hydrocarbyl compounds for their preparation, and to a method of preparing them.

It is known from British Pat. No. 1,117,183 to polymerize cyclic ethers containing 3 atoms in the ring, for instance the 1,2-epoxides, without the use of a metal hydrocarbyl compound, notably by using a zinc or cadmium salt of a xanthic acid as the catalyst. Xanthic acids are defined herein compounds of the formula R — O — C(S) — SH, wherein R denotes a hydrocarbyl group. Hence these acids are more specifically designated by the name O-hydrocarbyl xanthic acids or O-hydrocarbyl dithiocarboxylic acids; the more specific designation for the xanthate group R — O — C(S) — S — is O-hydrocarbyl xanthate group or O-hydrocarbyl dithiocarbonate group.

A new process has now been found for the preparation of high molecular weight polyethers with the aid of a novel catalyst system which is more active than the catalyst systems described in said British patent specification.

According to the invention, polyether type homopolymers and/or copolymers are prepared by a process which comprises contacting at least one cyclic ether with a catalyst comprising a reaction product of an O-hydrocarbyl xanthate of a divalent metal and an alkoxide of a trivalent metal.

Although the structure of the present catalysts is not precisely known, it was possible to establish that, besides the two metals, they contain sulfur, which probably forms part of a xanthate group.

The cyclic ethers to be polymerized are preferably ethers having one ring that consists of one oxygen atom and two or three carbon atoms. Cyclic ethers containing up to about 12 carbon atoms, e.g., 2 to 9 carbon atoms are preferred. Cyclic ethers suitably employed for the preparation of polyether type homopolymers and/or copolymers according to the invention are those of the formula

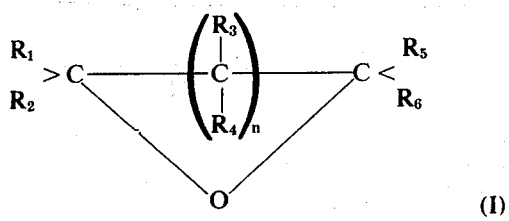

(I)

wherein $n$ represents 0 or 1 and $R_1$, $R_2$, $R_3$, $R_4$, $R_5$ and $R_6$ each individually represent a hydrogen atom or a hydrocarbyl group which may contain a halogen atom or a hydrocarbyloxy group as a substituent, and in which symbols $R_1$ and $R_5$ may be linked together to form a cycloaliphatic ring. Exemplary are ethylene oxide, propylene oxide, the butylene oxides, epichlorohydrin, epibromohydrin, the alkyl glycidyl ethers such as those in which the alkyl group contains 1 – 8 carbon atoms, the aryl glycidyl ethers such as phenyl glycidyl ether, styrene oxide, cyclohexane oxide, butadiene monoxide or dioxide, vinyl glycidyl ether, allyl glycidyl ether, crotyl glycidyl ether, the allyl phenyl glycidyl ethers, the crotyl phenyl glycidyl ethers, vinylcyclohexene monoxide, as well as the oxetanes such as trimethylene oxide, and finally also the substitution products of these ethers, in which at least one hydrogen atom has been replaced by a halogen atom. In the process according to the invention, these ethers can be used to prepare not only homopolymers but also copolymers. In the latter case two, three or more representatives of the said ethers can be copolymerized together.

It is preferred to use vicinal epoxides, i.e., the cylic ethers according to formula I above wherein $n$ represents 0. Especially preferred are one or more representatives of the group: ethylene oxide, propylene oxide, styrene oxide, phenyl glycidyl ether, allyl glycidyl ether and butadiene monoxide. The most preferred are propylene oxide and mixtures thereof with an unsaturated cyclic ether, such as, for instance, allyl glycidyl ether or butadiene monoxide. A third monomer, such as phenyl glycidyl ether, can also be present.

The catalyst according to the invention is prepared by reacting a compound of a trivalent metal of the formula:

(A)

with a compound of a divalent metal of the formula:

(B), in which formulae M' is a trivalent metal, M a divalent metal or a metal-containing radical, of which the metal has two free valences, and Z is an —OR group or an —S—C(S)—OR group, one of the two symbols X and Y represents an OR group, the other representing an —S—C(S)—OR group, while the symbols R represent monovalent hydrocarbyl groups, which may be identical or non-identical, having 1 to 6 carbon atoms. The hydrocarbyl groups R are preferably alkyl groups.

Preferred catalysts are prepared by reacting a compound (A) of the aforementioned formula (RO)(RO)M' — X, wherein X is exclusively a hydrocarbyloxy group, with a compound (B) of the aforementioned formula Y—M—Z, wherein Y and Z exclusively denote O-hydrocarbyl xanthate groups.

The trivalent metal M' may be a trivalent metal of groups III to IV and VIII of the Periodic System, while the divalent metal M may belong to Groups I, II, and IV to VIII. The periodic system herein refers to the Periodic Table of the Elements, Handbook of Chemistry and Physics, Chemical Rubber Co., 50th Ed, (1969) page B-3. As representatives of the metal M' aluminum, iron, molybdenum, chromium, vanadium, titanium, zirconium, boron, gallium, scandium, indium, thallium and bismuth may be mentioned. Aluminum is most preferred. Suitable examples of compound A are aluminum triethoxide, aluminum tri-isopropoxide and aluminum tri-isobutoxide.

Examples of the divalent metal or the divalent metal-containing radical M are copper, beryllium, magnesium, zinc, cadmium, calcium, strontium, barium, tin, titanium, vanadium, vanadyl (VO), titanyl (TiO), palladium, platinum, chromium, uranyl ($UO_2$), zirconyl (ZrO), nickel, cobalt, iron, manganese, molybdenum, R$_2$Sn (IV), wherein R denotes a monovalent hydrocarbyl group and CpTi(IV) wherein Cp represents a cyclopentadienyl group. The divalent metal zinc is most preferred. Suitable examples of zinc xanthates are zinc bis(O-ethyl xanthate), zinc bis(O-isopropyl xanthate) and zinc bis(O-n-butyl xanthate).

It has been found that by far the best results are obtained with catalysts consisting of the solid products of the reaction between (A) and (B), the reaction products being preferably suspended in a liquid organic diluent, for example in the medium in which these reaction products were formed.

In the reaction between (A) and (B) the molar ratio A to B is preferably between 0.01 and 100:1 and particularly between 0.1 and 10. The preferred temperature for this reaction is between 50° and 300°C.

The catalyst preparation preferably takes place under anhydrous conditions and with the exclusion of oxygen, and as a rule with the aid of a solvent; the polymerization can be carried out either in the presence or in the absence of a solvent or diluent, again preferably under anhydrous conditions and with the exclusion of oxygen. By "anhydrous" is meant that the relevant medium contains less than 50 parts by weight of water per million parts by weight of catalyst. Solvents may be used, ethers, for example dialkyl, aryl, or cycloalkyl ethers, such as diethyl ether, aromatic hydrocarbons, for example benzene, toluene or xylene, saturated aliphatic or cycloaliphatic hydrocarbons, for example n-heptane or cyclohexane, tetrahydronaphthalene and decahydronapthalene and halogenated hydrocarbons, such as methyl chloride, methylene chloride, chloroform, carbon tetrachloride and dichloroethane. In addition, mixtures consisting of two or more of the above solvents may be used.

If desired, the preparation of the catalyst may be followed by a treatment of the reaction product with a primary alcohol.

In the polymerization process according to the invention the catalyst is generally used in quantities between 0.001 and 30 gram-atoms, preferably between 0.5 and 5 gram-atoms of combined metals (M + M') per 100 mol of monomer (or mixture of monomers). The polymerization temperature may vary within wide limits, for example between −80°C and + 200°C, preferably between 20° and 120°C.

Depending on the monomers and/or monomer ratios used, the polymerization products are rubbers or plastics. Rubbery products are, for example, the homopolymers of propylene oxide, or epichlorohydrin and of butadiene monoxide and further the copolymers of epichlorohydrin and ethylene oxide and/or propylene oxide, as well as the copolymers substantially consisting of structural units derived from propylene oxide. The rubbery products frequently contain a considerable amount of crystalline product. In the case of propylene oxide polymers, for instance, this amount may exceed 20% by weight. If desired, the rubbery reaction products may be vulcanized, for instance with the aid of peroxides, or if they possess sufficient unsaturation (such as may, inter alia, by the case when butadiene monoxide or allyl glycidyl ether is used as a comonomer) then with the aid of sulfur-based vulcanization systems. As a rule, the vulcanizates are characterized by good resistance to ozone and to ageing. The use of propylene oxide in the homo- or copolymerization process generally imparts improved low-temperature behavior to the end product.

The invention is further illustrated by means of the following examples.

EXAMPLE I

A dry three-necked flask having a capacity of 250 ml and provided with a nitrogen inlet tube, a magnetic stirrer and a condenser, was filled with dry pure nitrogen. Subsequently 50 ml of dry, nitrogen-saturated toluene, 5.10 g (0.025 mol) of aluminum triisopropoxide and 3.84 g (0.0124 mol) of zinc bis(O-ethyl xanthate) were introduced into the flask. With magnetic stirring, the mixture was boiled for 12 hours at atmospheric pressure under nitrogen (temperature ca. 110°C), yielding 46 ml suspension which was kept under nitrogen.

EXAMPLE II

The procedure of Example I was repeated, except that 30 ml toluene was used and boiling was continued for 23 hours. The suspension formed was evaporated to dryness under reduced pressure, after which the solid residue was washed with toluene. All treatments took place under nitrogen. The residue was suspended in 35 ml of dry toluene and kept under nitrogen. Analysis showed the residue to contain 13 %w aluminum, 21 %w zinc, 10.2 %w carbon, 2.7 %w hydrogen and 23.4 %w sulfur.

EXAMPLE III

The procedure of Example I was repeated, except that 60 ml toluene was used and the reaction time was 52 hours. The suspension obtained was concentrated until the volume amounted to 33 ml and subsequently again kept under nitrogen.

EXAMPLE IV

The procedure of Example II was repeated, except that 4.19 g (0.0125 mol) zinc bis(O-isopropyl xanthate) was used instead of 0.0125 mol zinc bis(O-ethyl xanthate). The resultant suspension had a volume of 30 ml and was stored under nitrogen.

EXAMPLE V

The procedure of Example III was repeated, except that 4.24 g (0.0177 mol) zinc bis(O-n-butyl xanthate) was used (instead of 0.0125 mol zinc bis(O-ethyl xanthate)) and the reaction period was 2.5 hours (instead of 52 hours). The suspension formed was concentrated to a volume of 30 ml and subsequently kept under nitrogen.

EXAMPLE VI

In a dry polymerization reactor having a capacity of 100 ml and filled with nitrogen, a number of polymerization experiments were carried out with the exclusion of moisture and air. For this purpose the quantity of dry, nitrogen-saturated solvent mentioned in the table and 10 ml propylene oxide were successively introduced into the reactor. The propylene oxide had been previously purified by first boiling it with solid NaOH, subsequently distilling it off and then distilling it over calcium hydride. After the propylene oxide had been introduced into the polymerization reactor, catalyst suspension was added to the reactor contents in such an amount (see table) that the volume of the total contents amounted to 50 ml. The polymerization temperature was 50°C. The polymerization was stopped by adding ethanol of 96 %w concentration. After drying of the resulting material at 40° – 50°C under reduced pressure, the yield of polypropylene oxide was determined (after correction for the residual catalyst). The other conditions of test, as well as the results are summarized in the table. The table also contains the data of comparative experiments 9, 10 and 11, in which a zinc-bis(O-alkyl xanthate) exclusively was used as the catalyst instead of a reaction product thereof with an aluminum alkoxide. The inherent viscosity (IV) of the polymers was determined at 30°C in toluene at a polymer concentration of 100 mg per 100 ml toluene. A dash in the IV column of the table means that the IV was not determined.

TABLE.—POLYMERIZATION OF PROPYLENE OXIDE

| Exp. No. | Catalyst suspension Type | Ml. | Solvent Nature | Ml. | Reaction duration, hours | Yield, weight percent | IV, dl./g. |
|---|---|---|---|---|---|---|---|
| 1 | According to Ex. I | 4.0 | n-Heptane | 36 | 6 | 74 | 2.5 |
| 2 | do | 4.0 | do | 36 | 4.25 | 63 | |
| 3 | do | 3.0 | do | 37 | 6 | 65 | |
| 4 | According to Ex. II | 2.3 | Toluene | 37.7 | 6 | 44 | 2.5 |
| 5 | According to Ex. III | 2.0 | do | 38 | 6 | 40 | 2.1 |
| 6 | According to Ex. III | 4.0 | do | 36 | 6 | 67 | [1] 1.9 |
| 7 | According to Ex. IV | 2.0 | do | 38 | 6 | 27 | 2.3 |
| 8 | According to Ex. V | 2.0 | do | 38 | 6 | 37 | 3.1 |
| 9 | Zn(O-Et-Xtg)$_2$ | [2] 4.0 | do | 36 | 6 | 5 | |
| 10 | Zn(O-iPr-Xtg)$_2$ | [3] 4.0 | n-Heptane | 36 | 6 | 1 | |
| 11 | Zn(O-n-Bu-Xtg)$_2$ | [4] 4.0 | do | 36 | 6 | 0 | |

[1] This polymer contained a fraction of ca. 30% which was insoluble in acetone at $-15°$ C., while X-ray analysis also revealed that more than 20% of the polymer consisted of crystalline material.
[2] Suspension of 0.26 g. zinc bis(O-ethyl xanthate) in 4 ml. toluene.
[3] Suspension of 0.25 g. zinc bis (O-isopropyl xanthate) in 4 ml. n-heptane.
[4] Suspension of 0.32 g. zinc (O-n-butyl xanthate) in 4 ml. n-heptane.

EXAMPLE VII

In a procedure similar to that described in Example VI, a copolymerization of 10 ml isopropyl glycidyl ether (exp. No. 12) and a polymerization of 10 ml phenyl glycidyl ether (exp. No. 13) were carried out at 50°C. In both polymerizations the catalyst suspension prepared according to Example III was used in an amount of 3 ml. The duration of the reaction was 24 hours. In exp. No. 12 an amount of 37 ml n-heptane and in exp. No. 13 a mixture of 10 ml toluene and 35 ml n-heptane was used. The yield of isopropyl glycidyl ether polymer was 16 %w, while in the polymerization of phenyl glycidyl ether a yield of 90 %w polymer was obtained, which polymer proved to be insoluble in toluene at 30°C.

I claim as my invention:

1. A process which comprises polymerizing at least one cyclic ether having a ring that consists of one oxygen atom and 2 or 3 carbon atoms in the presence, as catalyst, of the solid product of the reaction of a compound of a trivalent metal of the formula:

$$(RO)(RO)Al(RO) \quad (A)$$

with a compound of a divalent metal of the formula:

$$Y - Zn - Z \quad (B)$$

in which formulae Z is an —S—C(S)—OR group, Y is an —S—C(S)—OR group, and the symbols R represent alkyl groups, which may be identical or non-identical, of 1 to 6 carbon atoms.

2. A process as in claim 1, wherein the cyclic ethers are vicinal epoxides.

3. A process as in claim 1, wherein the cyclic ether is selected from propylene oxide and phenyl glycidyl ether and mixtures thereof.

4. A process as in claim 1 wherein the amount of catalyst is equivalent to 0.5 to 5 gram atoms of total metal (M + M′) per 100 moles of monomer.

5. A process for the preparation of a catalyst which comprises reacting a compound of a trivalent metal of the formula:

$$(RO)(RO)Al(RO) \quad (A)$$

with a compound of a divalent metal of the formula:

$$Y - Zn - Z \quad (B)$$

in which formulae Z is an —S—C(S)—OR group, Y represents an —S—C(S)—OR group, and the symbols R represent alkyl groups, which may be identical or non-identical, of 1 – 6 carbon atoms; in a molar ratio of (A) to (B) between 0.01 to (1 and 100:1 at a temperature between 50° and 300°C.

6. A process as in claim 5 wherein the molar ratio of (A):(B) is between about 0.1:1 and 10:1.

7. A process as in claim 6 wherein compound (B) is a zinc bix(O-alkyl xanthate).

8. The catalyst prepared according to the process of claim 5.

* * * * *